March 6, 1962 W. M. McCONNELL 3,023,608
APPARATUS FOR DOUBLING CAPACITY OF A PIPE TESTER
Filed Aug. 16, 1960 4 Sheets-Sheet 1

INVENTOR.
William Mynard McConnell
BY Webb, Mackay & Burden
HIS ATTORNEYS

March 6, 1962 W. M. McCONNELL 3,023,608
APPARATUS FOR DOUBLING CAPACITY OF A PIPE TESTER
Filed Aug. 16, 1960 4 Sheets-Sheet 3
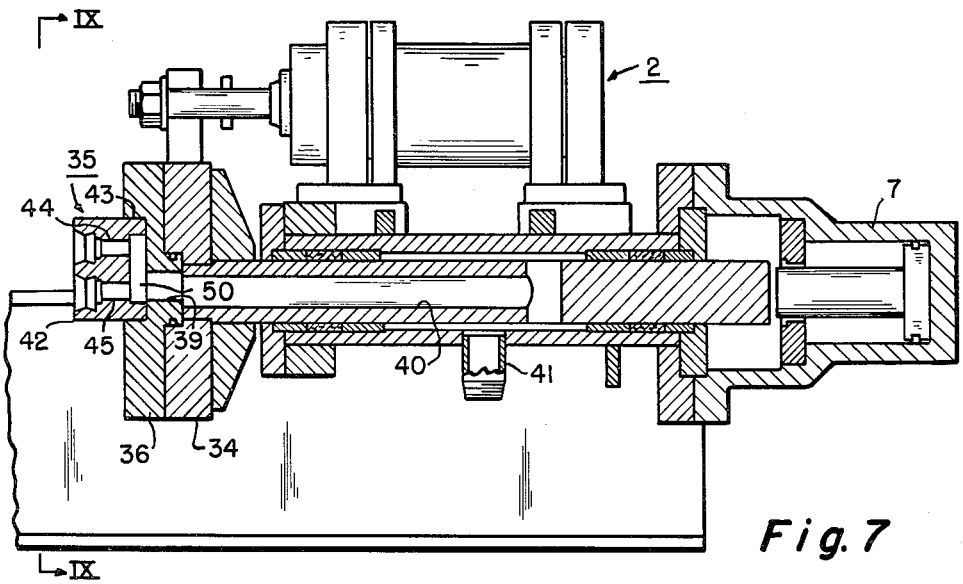
Fig. 7
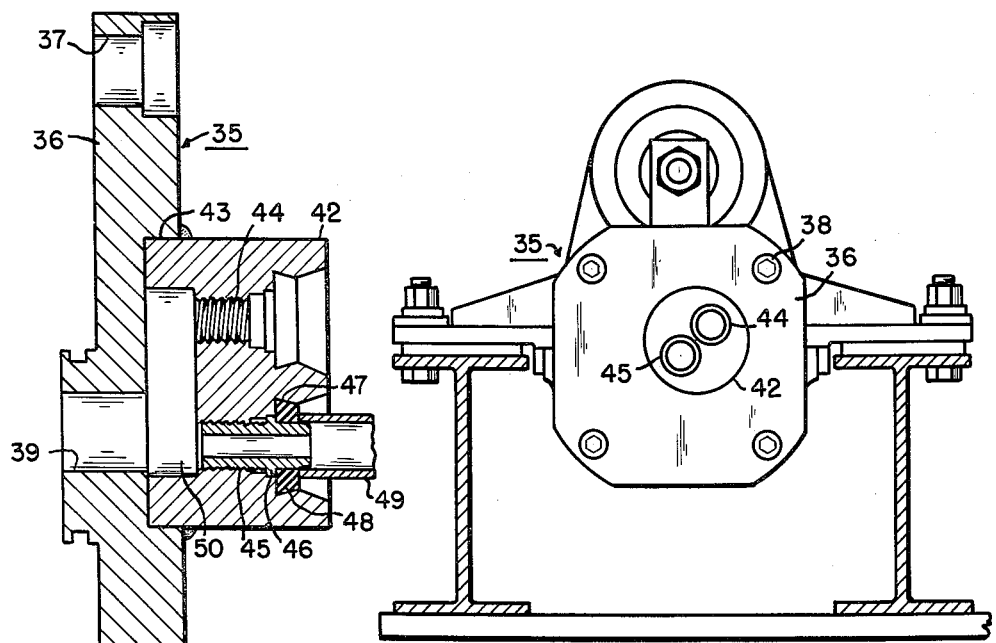
Fig. 8
Fig. 9
INVENTOR.
William Mynard McConnell
BY Webb, Mackey & Burden
HIS ATTORNEYS March 6, 1962

W. M. McCONNELL 3,023,608

APPARATUS FOR DOUBLING CAPACITY OF A PIPE TESTER

Filed Aug. 16, 1960

INVENTOR.
William Mynard McConnell

BY Webb, Mackey & Burden

HIS ATTORNEYS

United States Patent Office 3,023,608
Patented Mar. 6, 1962

3,023,608
APPARATUS FOR DOUBLING CAPACITY OF A PIPE TESTER
William Mynard McConnell, Pittsburgh, Pa., assignor to Taylor-Wilson Manufacturing Company, Pittsburgh, Pa., a corporation of Pennsylvania
Filed Aug. 16, 1960, Ser. No. 49,978
26 Claims. (Cl. 73—49.6)

This invention relates to apparatus for testing and handling lengths of pipe, tubing, conduit, etc. and more particularly, to apparatus which can be added or built into existing pipe testers or test benches to double their capacity.

These pipe testers or test benches deliver hydraulic fluid such as water to lengths of pipe located therein, fill the pipe with the fluid and then place the fluid under a predetermined amount of pressure to ascertain its ability to withstand minimum specified pressures. Generally, these pipe testers have spaced apart heads at least one of which is movable toward and away from the other to accommodate different lengths of pipe.

In operation of the test benches, a length of pipe is delivered thereto and located between the spaced apart heads which then move into engagement with the ends of the pipe and effect a substantially fluid-tight seal therewith. Intermediate the heads, the pipe is supported and clamped along its length during a testing cycle. Once the test heads have effected a seal with the pipe ends and the pipe has been supported and clamped upon saddles mounted upon the test bench, water enters the pipe through one of the heads, fills the pipe and then pressure of the water within the pipe and test heads is raised to an amount such as 10,000–20,000 p.s.i. to determine soundness of the pipe walls and their ability to withstand minimum specified pressures.

To insure maintenance of the seal with the ends of the pipe during testing, one of the heads has a compensator which usually is a hydraulic motor for applying a slightly greater force or pressure to one end of the pipe during testing than is applied to the other end of the pipe by the hydraulic fluid during the test cycle. This slightly higher pressure avoids accidental or inadvertent breakage of the seal with the ends of the pipe and insures that the pipe ends remain in the heads throughout the test cycle.

My invention permits doubling capacity of existing pipe testers with little or no additional space requirements and without substantial alteration of the test bench. Specifically, my invention comprises at least two saddles for receiving and supporting lengths of pipe. The saddles are positioned substantially transverse relative to the lengths of pipe and the test bench and are located between the heads and spaced apart from one another in a tandem arrangement so that each engages a part of a pair of pipe lengthwise.

Each saddle has a pipe receiving receptacle extending lengthwise thereof, located between the ends of the saddle and opening at its top. In addition, each pipe receiving receptacle has downwardly sloping sides which extend from the top of the saddle and a first and second notch adapted for engaging and supporting a part of a length of pipe. The first notch is at the lowest part of the receptacle where the downwardly sloping sides meet and the second notch is on one of the downwardly sloping sides below the top of the saddle and spaced apart from the first notch by a land which is part of its downwardly sloping side. Each notch is of such size that it accommodates only a single pipe.

My invention also comprises an adapter for each test head which is suitable for mounting upon that face of the head through which an end of the pipe extends into the head. The adapter comprises a face plate having a bore extending therethrough and so located thereon that when the plate is mounted upon a head, the bore connects with a channel of the head through which water flows to and from the pipe.

A pipe end receiving member is affixed to the face plate and extends outwardly away from the plate towards the pipe. The pipe end receiving member has two spaced apart pipe end cavities which extend longitudinally substantially therethrough. Each cavity receives at one end an end of the pipe and has pipe end sealing means for effecting a seal with the end of the pipe entered therein. The other end of each cavity opens into a chamber formed by the member and the face plate which chamber connects with the bore of the face plate so that water may flow through the bore, through the chamber and through each cavity to and from the pipe.

One of the cavities is so located on the pipe end receiving member that when mounted upon the test head, it is in alignment with the first notch of each of the saddles and the other cavity is so located on the pipe end receiving member that it is in alignment with the second notch of each of the saddles.

A second embodiment of the adapter of my invention comprises substantially the same face plate previously referred to in combination with a housing member which is affixed to the face plate and extends outwardly towards the pipe which has two spaced apart longitudinal passageways extending substantially therethrough. In each passageway is a piston which is in slidable engagement with the walls thereof. The end of each piston which is opposite the end of the pipe to be tested has a recess for receiving the end of the pipe and a sealing means for effecting a seal with the pipe. Disposed in each of the passageways and in engagement with the piston is a means such as a coil spring for urging the piston toward the pipe to be tested. The housing member has stop means for limiting travel of the pistons in their respective passageways.

Each of the passageways opens into a chamber formed by the housing member and the face plate with the chamber connecting with the bore of the face plate. Extending through each of the pistons is a longitudinal hole which connects the chamber with the end of the pipe disposed in the recess of each of the pistons so that water may flow into and out of the pipe through the hole, the chamber, the bore of the face plate and the head.

Each of the passageways may be slightly greater in diameter than the outside diameter of each pipe and each of the pistons may have an outside diameter slightly greater than the outside diameter of each pipe to insure maintenance of the seal with the pipe during testing.

The passageways are so located in the housing member that one is in alignment with the first notch of each of the saddles and the other is in alignment with the second notch of each of the saddles.

In combination with each saddle is a movable clamp located transversely of the lengths of pipe, adjacent each saddle and opposite the side of the saddle having the second notch. Connected to the clamp is a motor means such as a hydraulic cylinder for advancing the clamp from open position to closed position wherein, during advancement, the pipe engages a second length of pipe which has been delivered into the pipe receiving receptacle after a first length of pipe. Further advancement of the clamp pushes or conveys the second length of pipe into the second notch. When the clamp has moved the second length of pipe into the second notch and is in engagement with the second length of pipe disposed in the second notch, it is in closed position where it engages both the first and second lengths of pipe and holds them in their respective notches during the test cycle.

In the accompanying drawings, I have shown preferred embodiments of my invention in which:

FIGURE 7 is a side elevation view partly in section showing the water and fill end of the tester of FIGURE 1 with one embodiment of my adapter mounted upon the test head;

FIGURE 8 is an enlarged side elevation view in section of the adapter of FIGURE 7;

FIGURE 9 is a view along the line IX—IX of FIGURE 7;

Figure 1:
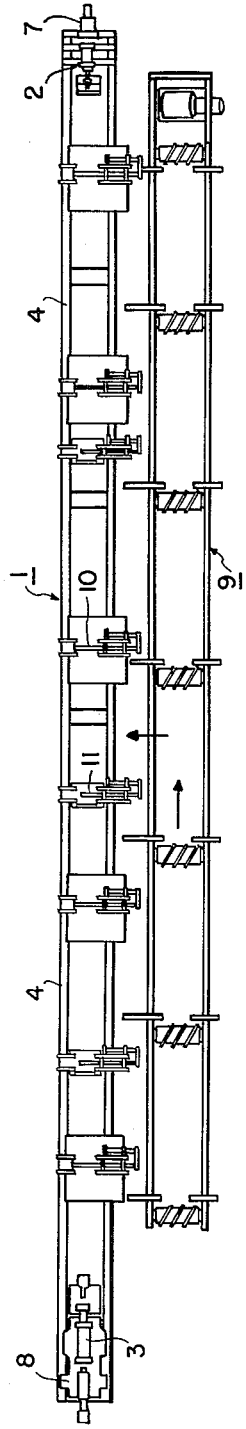
FIGURE 1 is a plan view of a conventional pipe test bench and alignment and feed table.
Figure 3:
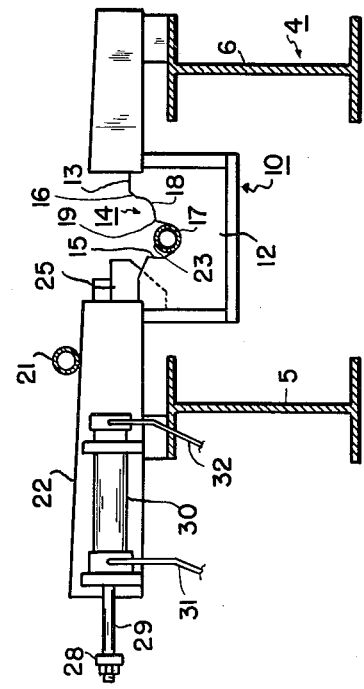
FIGURE 3 is a side elevation view of the clamp and saddle of FIGURE 2.

The conventional pipe testing bench 1 of FIGURE 1 comprises two spaced apart heads 2 and 3 mounted upon a frame 4 having two parallel spaced apart beams 5 and 6 (FIGURE 3) extending the length of the bench. The head 2 is the water and fill end and has a compensator 7 for insuring maintenance of the seal between the heads and the ends of the pipe during the test cycle and for keeping the ends of the pipe entered in the two heads. The other head 3 is affixed to a traveling carriage 8 which moves toward and away from the head 2 along the beams to permit spacing of the heads for testing different lengths of pipe.

Spaced apart and to one side of the test bench and located substantially parallel thereto is an alignment and feed table 9 which receives lengths of pipe to be tested and aligns them so that their ends are between the test heads and then delivers them into the test bench.

Interposed between the two test heads and located transversely thereof and of the frame 4 are saddles such as saddle 10 of FIGURES 2–6, which receive the lengths of pipe delivered into the test bench by the alignment and feed table 9. As shown, the saddles are spaced apart from each other and placed in tandem so that they support pipe along its length. Each saddle is aligned with the test heads and thereby position pipe received therein in the tester so that the pipe ends are easily and quickly positioned for engagement by the heads. Adjacent each saddle is a hydraulically operated clamp 11 which engages the pipe and clamps it upon the saddles for the test cycle.

Also mounted upon the test bench are a plurality of kick-out devices (not shown) for lifting the pipe up off the saddles and conveying them out of the test bench upon termination of the test cycle.

Referring to FIGURES 2–6 inclusive, each saddle is a substantially rectangular block 12 mounted upon the frame 4 and having a top surface 13 which extends lengthwise thereof. Between the ends of the block 12 is a pipe receiving receptacle 14 which also extends lengthwise of the saddle and is open at the top. The receptacle 14 has downwardly sloping sides 15 and 16 running from the top surface 13 and has a first notch 17 and a second notch 18. Each notch is of such a size that it accommodates only one pipe.

The first notch is at the lowest part of the receptacle where the downwardly sloping sides 15 and 16 meet. The second notch 18 is on side 16 below the top surface 13 and spaced apart and separated from the first notch 17 by a land 19 which is a part of the side 16. As shown in FIGURES 2–6 inclusive, the side 16 has a more gentle slope than the side 15.

Figure 5:
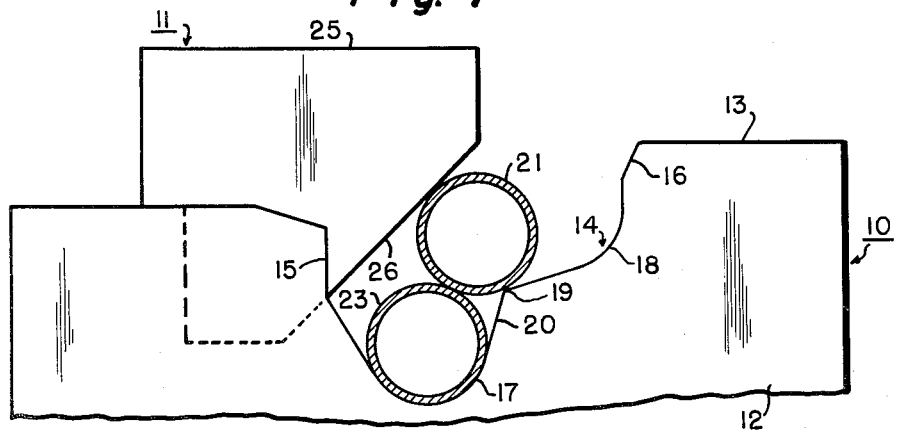
FIGURE 5 is a fragmentary view similar to FIGURE 4 showing the clamp moving the second length of pipe into its notch.

The land 19 extends downwardly into the first notch 17 and upwardly into the second notch 18 with that part 20 which extends downwardly into the first notch forming a part of that notch. As shown in FIGURE 5, the land assists in directing and guiding a second length of pipe 21 into the second notch.

Since the saddle 10 has the two notches, it can simultaneously support a pair of pipes for testing. The pair of pipe rolls along a skid 22, FIGURE 3, and down into the receptacle 14 where the sloping sides 15 and 16 guide a first pipe 23 into the first notch 17, FIGURES 3 and 4. The second pipe 21 generally has the location shown in FIGURE 4 upon its delivery into the receptacle where it partly rests upon the first pipe 23 and partly against the side 15.

Figure 6:
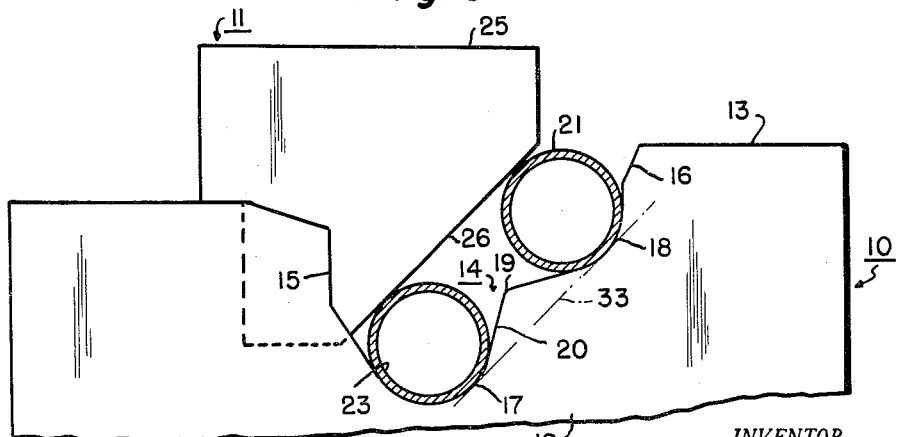
FIGURE 6 is a fragmentary view similar to FIGURE 4 showing the two lengths of pipe held in their respective notches for the test cycle by the clamp.

To convey the second pipe from its delivered position (FIGURE 4) into the second notch, the hydraulically operated clamp 11 advances from its open position (FIGURE 4) to its closed position (FIGURE 6) and, in so doing, engages the second pipe and pushes it from its delivered position (FIGURE 4) across the first pipe to the position shown in FIGURE 5 and thence into the second notch 18 as illustrated in FIGURE 6. In the position of FIGURE 6, the clamp engages both the first and second pipes 21 and 23 and securely holds them in their respective notches throughout the test cycle.

Figure 2:
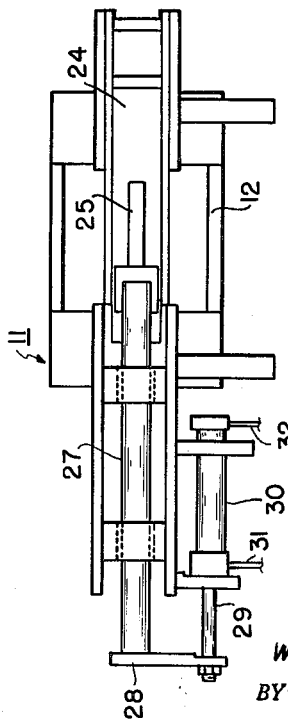
FIGURE 2 is a plan view of a combination of a clamp and a saddle of the test bench of FIGURE 1 embodying my invention.
Figure 4:
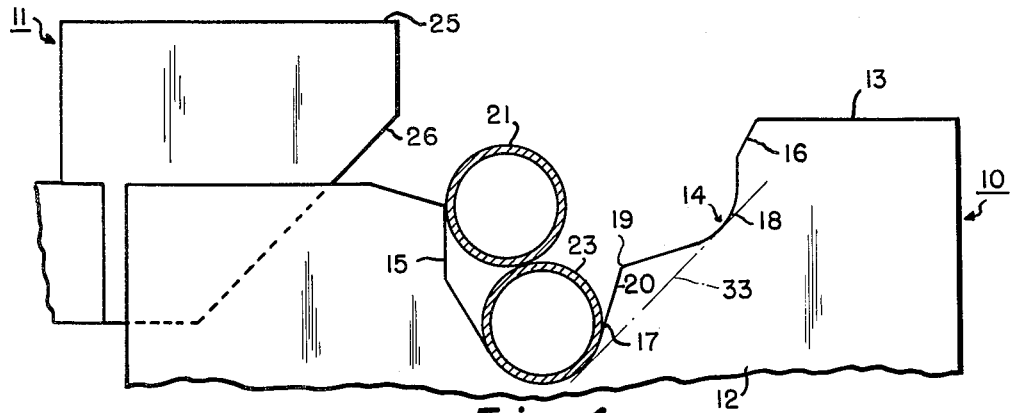
FIGURE 4 is a fragmentary side elevation view of the clamp and saddle of FIGURE 2 showing the position of two lengths of pipe which have been delivered into the saddle prior to testing.

The clamp 11 is mounted upon the frame 4 and positioned for travel in a slot 24 in the block 12 as shown in FIGURE 2. The clamp comprises a work head 25 having a beveled face 26 which engages the pipe. A movable and supporting shaft 27 carries the head at one end thereof; the other end of which is joined to a horizontal cross link 28 which, in turn, is connected to a piston rod 29 of a hydraulic motor cylinder 30. The motor 30 acting through the crosslink and the shaft, moves the head from open to closed position and from closed to open position. The shaft 27 is spaced apart from and parallel to the piston rod. Fluid under pressure can be fed to either end of the hydraulic motor 30 through conduits 31 and 32, thereby rendering the motor easily reversible for opening and closing the clamp.

The beveled face 26 of the work head 25 of the clamp forms a surface tangent to the periphery of both pipes when they are in their respective notches as shown in FIGURE 6. In addition, the beveled face is substantially parallel to a line such as line 33 which is tangent to both notches. Accordingly, when both lengths of pipe are in their respective notches, the workhead securely clamps them upon the saddle for the test cycle.

The second notch is located at an angle of about 45° relative to the first notch. However, satisfactory results are obtained when the second notch is disposed at angles ranging from about 25° to about 65° relative to the first notch.

To double the capacity of the test bench of FIGURE 1, an adapter for each head must be used so that water can be delivered through the heads into a pair of pipes for filling the pipes and then for raising the pressure of the water to a predetermined amount for the test cycle. FIGURES 7, 8 and 9 show the head 2 of the test bench with one embodiment of my adapter affixed to a conventional pipe end receiving block 34 of the head 2. The adapter 35 comprises a face plate 36 with holes 37 through which bolts 38 extend to secure the face plate 36 upon the receiving block 34.

Extending through the face plate is a bore 39 which connects with a channel 40 of the head through which water flows to and from the pipe via connection 41.

A first pipe end receiving housing 42 sets into a niche 43 of the face plate and extends outwardly away from the plate towards pipe to be tested. The bore 39 of the face plate 36 opens into the niche 43.

The first housing member has two spaced apart, substantially parallel pipe end cavities 44 and 45 running longitudinally substantially therethrough. In each cavity is a bushing 46 which, in combination with the walls of the cavity at one end of the housing forms a seat 47 for a gasket or ring 48 of resilient materials such as rubber or synthetic rubber. The end of the pipe 49 enters the cavity and abuts against the ring to form a substantially fluid-tight end seal for the test cycle (FIGURE 8).

Each cavity opens into a first chamber 50 formed by the first housing and the niche 43 of the face plate 36. As pointed out, the bore 39 of the face plate opens into the niche and, of course, the first chamber 50 so that water flows through the head 2, the bore 39, the chamber 50 and each of the cavities 44 and 45 into a pair of pipes.

Figure 10:
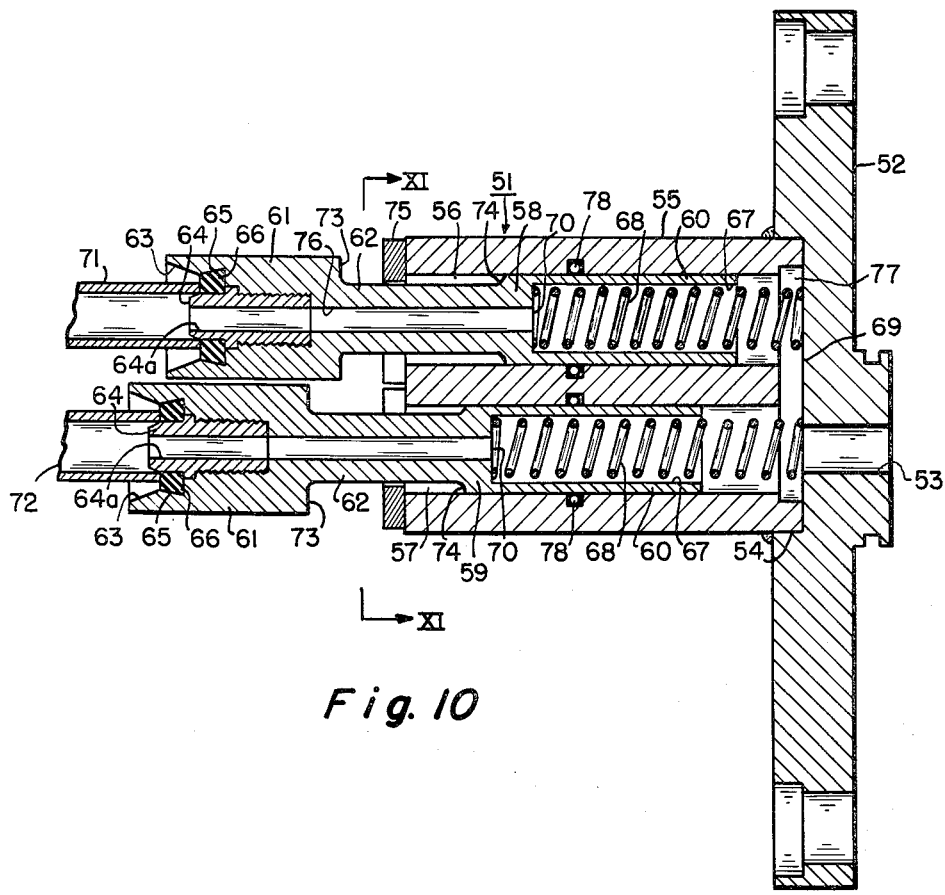
FIGURE 10 is a side elevation view in section of a second embodiment of the adapter of my invention.
Figure 11:
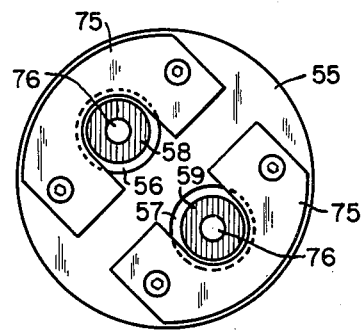
FIGURE 11 is a view along the line XI—XI of FIGURE 10.

The two cavities are so located in the first housing that when the adapter is mounted upon the head 2, cavity 45 is in alignment with each first notch 17 of each saddle and cavity 44 is in alignment with each second notch 18 of each saddle 10. In other words, the pipe end cavities are so located on the first housing that their central axes lie in a plane which is obliquely disposed relative to a horizontal plane having the central axis of the first housing and which obliquely intersects the horizontal plane. Thus, the adapter 35 has its pipe end receiving cavities positioned for receiving the ends of a pair of pipes clamped into position upon their respective notches of their saddles.

Where each pipe of a pair to be tested has the same length, then the adapter 35 of FIGURES 8 and 9 can be used on each head. Where, however, there is a difference in length between each pipe of a pair, then an adapter which has ability to accommodate differences in lengths and provided for sealing each pipe is required for at least one of the heads. The adapter 51 of FIGURES 10 and 11 is such an adapter and comprises a face plate 52 with a bore 53 extending therethrough and a niche 54 into which the bore opens, similar to the face plate 36. The face plate 52 is affixed to a head of the tester in the same manner as the face plate 36.

Mounted in the niche 54 is a second housing member 55 which extends outwardly from the face plate towards the ends of a pair of pipes. The second housing member has two spaced apart longitudinal passageways 56 and 57 extending substantially therethrough with pistons 58 and 59 disposed in the passageways respectively. Each piston has a rear end part 60 in slidable engagement with the walls of its passageway and a front end part 61 which is connected to the first end part by a neck 62. As shown in FIGURES 10 and 11, the front end part 61 is outside the second housing member.

The front end part has a recess 63 which receives the end of the pipe and a bushing 64 which forms with the walls of the recess a seat 65 for supporting a ring or gasket 66 of a resilient material. The end of the pipe abuts against the ring 66 the same as the ring 48 of the adapter of FIGURES 7 and 8 and forms a substantially fluid-tight seal with the end of the pipe.

As shown in FIGURE 10, the rear end part 60 of the piston has a rearwardly extending hollow sleeve 67 which receives a coil spring 68 seated at one end upon the niche wall 69 and at the other end upon a wall 70 of the sleeve 67. This coil spring urges each piston outwardly into engagement with the end of the pipe and enables the test bench to accommodate a pair of different length pipes. For example, as shown in FIGURE 10, pipe 71 is longer than pipe 72 and thus piston 59 is more advanced than piston 58 with the spring 68 urging each piston outwardly into engagement with the pipes 71 and 72. Preferably, the pistons have a stroke of about 3 to 6 inches and thus a test bench equipped with the adapter of FIGURES 10 and 11 can accommodate a pair of pipes with a length differential of about 6 inches.

The coil spring 68 performs two important functions: (1) urging each piston into engagement with the end of the pipe to bring the ring 66 into abutment with the end of the pipe, and (2) maintaining each piston in engagement with the pipe end until water under pressure is introduced into the pipe and either assists or takes over from the spring maintenance of each piston in engagement with its pipe while permitting each piston to individually and independently adjust for differences in length between two pipes of a pair.

Shoulders 73 and 74 formed by the intersection of the neck 62 with the front part 61 and the rear part 60 respectively of the piston, in cooperation with a collar 75, limit the stroke of each piston. The collar is mounted upon the front face of the second housing member and extends a short distance transversely across each passageway, as shown in FIGURE 11. Thus, travel of the piston to the right, viewing FIGURE 10, is limited by engagement of shoulder 73 with the collar 75 and travel of the piston to the left, viewing FIGURE 10, is limited by engagement of shoulder 74 with the collar.

The shoulder 73 is so located on each piston that engagement by it with the collar 75 leaves the rear end of each piston spaced apart from the niche wall 69 to insure a passage for water flow to and from the pipe.

Extending longitudinally through each piston is a hole 76 which connects with a hole 64a extending longitudinally through the bushing 64 and which opens into a second chamber 77 formed by the niche 54 and the rear end of the second housing member 55. The bore 53 of the face also opens into the chamber, thereby permitting water to flow simultaneously to and from each pipe through the head to which the adapter of FIGURES 10 and 11 is affixed, the bore 53, the chamber 77 and the hole 76.

To insure maintenance of the seal with the end of the pipe during testing, the diameter of each passageway and the outside diameter of the rear part of each piston is slightly greater than the outside diameter of the pipe by about at least 2–5% and sometimes by about 10%. This difference in diameters between the pipe and the piston and the passageway produces a slightly greater load on one end of the pipe than the other end during the test cycle. In this way, the adapter of FIGURES 10 and 11 functions as a secondary compensator to assure maintenance of the seal during the test cycle.

As shown in FIGURE 10, there is a sealing ring 78 between the rear part of each piston and each passageway to prevent leakage of water under pressure from the second housing member.

The two passageways 56 and 57 are so located in the second housing member that their position is similar to those of the cavities in the first housing member. In other words, the passageway 56 and, of course, the recess 63 of piston 58 is in alignment with each second notch of the saddles and the passageway 57 and the recess 63 of piston 59 is in alignment with each first notch of the saddles. Thus, the passageways are so located that their central axes lie in a plane which is obliquely disposed relative to a horizontal plane having the central axis of the second housing member and which plane obliquely intersects the horizontal plane.

While the two adapters shown and described are designed for end sealing of the pipe, the adapters may also be used for outside sealing of pipe wherein the seal ring is disposed within either the cavity or the recess and fits around and in engagement with the outside periphery of the pipe adjacent its ends.

The saddles and movable clamps have application for processing and handling pipe in addition to hydraulic testing. For example, the saddles and clamps can be used in combination with apparatus which blows out pipe interiorly to remove dirt therefrom and other apparatus which applies a lacquer or protective coating to the interior of pipe.

My invention in apparatus for doubling the capacity of existing test benches reduces pipe handling time and time for filling and purging water from a pipe without additional space requirements and without extensive reconstruction of the test bench. To double the capacity of an existing bench, one needs merely to substitute my saddles for those in the bench and to mount the adapters on the test heads. Thus, a test bench for accommodating single pipe can be converted into one which accommodates a pair of pipes; a bench for testing two lengths of pipe can be converted into one which handles four lengths of pipe simultaneously; and a bench which tests three lengths of pipe can be converted into one which tests six lengths of pipe simultaneously, etc.

While I have shown and described preferred embodiments of my invention, it is to be understood that it may be otherwise embodied within the scope of the following claims.

I claim:

1. Apparatus for doubling capacity of a pipe tester to handle and test lengths of pipe, said tester having spaced apart heads for engaging and sealing the ends of pipe and for filling the pipe with hydraulic fluid under pressure, said apparatus comprising at least two saddles for receiving and supporting lengths of pipe, said saddles being disposed substantially transverse relative to said lengths of pipe and said heads, being located between said heads and being spaced apart from each other and located in tandem so that each engages a part of pipe lengthwise thereof, each saddle having a pipe receiving receptacle extending lengthwise thereof, located between the ends thereof and opening at the top thereof, said pipe receiving receptacle having downwardly sloping sides extending from the top of said saddle and having first and second notches, each adapted for engaging and supporting a part of a length of pipe, said first notch being located at the lowest part of said receptacle where the downwardly sloping sides thereof meet, said second notch being on one of said downwardly sloping sides below said top and spaced apart from said first notch by a land which is a part of said one downwardly sloping side, each notch being of such size that it accommodates a single length of pipe, an adapter for each head, said adapter being suitable for mounting upon each head opposite the ends of the pipe, extending outwardly from the head towards the ends of the pipe and having two spaced apart pipe end cavities extending longitudinally substantially therethrough, each pipe end cavity receiving at one end an end of the pipe and having pipe end sealing means for effecting a seal with the end of the pipe entered therein, each of said pipe end cavities opening at its other end into a chamber of said adapter which chamber is in connection with a channel of said head whereby hydraulic fluid flows to and from pipe through said channel, said chamber and each of said pipe end cavities, one of said pipe end cavities being located so that it is in alignment with said first notch of each of said saddles and said other pipe end cavity being located so that it is in alignment with said second notch of each of said saddles.

2. The apparatus of claim 1 characterized by movable means disposed transverse of said length of pipe, disposed adjacent each of said saddles and opposite said one side with the second notch, said movable means having a pipe engaging part, cooperating means for moving said movable means toward said one side so that said pipe engaging part contacts a second length of pipe in said receptacle and in a delivered position from a source of pipe whereat it lies at least partially upon a first length of pipe in said first notch, movement of said movable means toward said one side conveying said second length of pipe from its delivered position into said second notch, during conveying of said second length of pipe, said land cooperating in directing the second length of pipe into said second notch.

3. The movable means of claim 2 characterized by said movable means also being a clamping means whose pipe engaging part simultaneously contacts said first and said second lengths of pipe when said two lengths are disposed in their respective notches and maintains said two length of pipe in their respective notches during testing said pipe.

4. Apparatus for doubling capacity of a pipe tester to handle and test lengths of pipe, said tester having spaced apart heads for engaging and sealing the ends of pipe and for filling the pipe with hydraulic fluid under pressure, said apparatus comprising at least two saddles for receiving and supporting lengths of pipe, said saddles being disposed substantially transverse relative to said lengths of pipe and said heads, being located between said heads and being spaced apart from each other and located in tandem so that each engages a part of pipe lengthwise thereof, each saddle having a pipe receiving receptacle extending lengthwise thereof, located between the ends thereof and opning at the top thereof, said pipe receiving receptacle having downwardly sloping sides extending from the top of said saddle and having first and second notches, each adapted for engaging and supporting a part of a length of pipe, said first notch being located at the lowest part of said receptacle where the downwardly sloping sides thereof meet, said second notch being on one of said downwardly sloping sides below said top and spaced apart from said first notch by a land which is a part of said one downwardly sloping side, each notch being of such size that it accommodates a single length of pipe, an adapter for each test head suitable for mounting upon each head opposite the ends of the pipe, one of said adapters being suitable for mounting upon each head opposite the ends of the pipe, extending outwardly from the head towards the ends of the pipe and having two spaced apart pipe end cavities extending longitudinally substantially therethrough, each pipe end cavity receiving at one end an end of the pipe and having pipe end sealing means for effecting a seal with the end of the pipe entered therein, each of said pipe end cavities opening at its other end into a chamber of said adapter which chamber is in connection with a channel of said head whereby hydraulic fluid flows to and from pipe through said channel, said chamber and each of said pipe end cavities, one of said pipe receiving cavities being located so that it is in alignment with said first notch of each of said saddles and said other pipe receiving cavity being so located that it is in alignment with said second notch of each of said saddles, the other of said adapters extending outwardly from its head towards the ends of the pipe and having two spaced apart longitudinal passageways extending substantially therethrough, a piston disposed in each of said passageways for travel in slidable engagement therewith, that end of each of said pistons opposite an end of a pipe to be tested having a recess for receiving the end of the pipe and having sealing means for effecting a seal with the end of the pipe, means disposed in each of said passageways and in engagement with said piston therein for urging said piston toward the end of the pipe, said other adapters having stop means for limiting travel of said pistons in their respective passageways, each of said passageways opening into a chamber of said other adapter, each of said pistons having a longitudinal hole extending therethrough and opening to the end of a length of pipe and connecting into said chamber so that hydraulic fluid may flow through said chamber and each of said holes to and from said pipe, one of said passageways being so located on said other adapter that it is in alignment with said first notch of each of said saddles and said other passageway being so located on said other adapter that it is in alignment with said second notch of each of said saddles.

5. The apparatus of claim 4 characterized by each of said passageways of said other adapter being slightly greater in diameter than the outside diameter of each pipe to be tested and each of said pistons disposed in said passageways having an outside diameter slightly greater than the outside diameter of each pipe to be tested to insure maintenance of said seal with the ends of the pipe during testing.

6. The apparatus of claim 4 characterized by each of said pistons of said other adapter having a first part disposed in each of said passageways and being in slidable engagement therewith, having a second part which extends outwardly from the end of said passageway towards said end of the pipe and which is outside said passageway, said second part having a recess for receiving the end of the pipe, said recess having sealing means for effecting a seal with the end of the pipe, said other adapter and each of said pistons having cooperating means for limiting travel of each of said pistons in their respective passageways.

7. The apparatus of claim 4 characterized by movable means disposed transverse of said lengths of pipe, disposed adjacent each of said saddles and opposite said one side with the second notch, said movable means having a pipe engaging part, cooperating means for moving said movable means toward said one side so that said pipe engaging part contacts a second length of pipe in said receptacle and in its delivered position from a source of pipe whereat it lies at least partially on a first length of pipe located in said first notch, movement of said movable means toward said one side conveying said second length of pipe from its delivered position into said second notch, during conveying of said second length of pipe, said land cooperating in directing the second length of pipe into said second notch.

8. The movable means of claim 7 characterized by said movable means also being a clamping means whose pipe engaging part simultaneously contacts said first and said second lengths of pipe when said two lengths are disposed in their respective notches and maintains said two lengths of pipe in their respective notches during testing said pipe.

9. The apparatus of claim 4 characterized by each of said passageways of said other adapter being slightly greater in diameter than the outside diameter of each pipe to be tested and each of said pistons disposed in said passageways having an outside diameter slightly greater than the outside diameter of each pipe to be tested to insure maintenance of said seal with the ends of the pipe during testing, and characterized by movable means disposed transverse of said lengths of pipe, disposed adjacent each of said saddles and opposite said one side with the second notch, said movable means having a pipe engaging part, cooperating means for moving said movable means toward said one side so that said pipe engaging part contacts a second length of pipe in said receptacle and in its delivered position from a source of pipe whereat it lies at least partially on a first length of pipe located in said first notch, movement of said movable means toward said one side conveying said second length of pipe from its delivered position into said second notch, during conveying of said second length of pipe, said land cooperating in directing the second length of pipe into said second notch.

10. The movable means of claim 9 characterized by said movable means also being a clamping means whose pipe engaging part simultaneously contacts said first and said second lengths of pipe when said two lengths are disposed in their respective notches and maintains said two lengths of pipe in their respective notches during testing said pipe.

11. Apparatus for doubling capacity of a pipe tester to handle and test lengths of pipe, said tester having spaced apart heads for engaging and sealing the ends of pipe and for filling the pipe with hydraulic fluid under pressure, said apparatus comprising at least two saddles for receiving and supporting lengths of pipe, said saddles being disposed substantially transverse relative to said lengths of pipe and said heads, being located between said heads and being spaced apart from each other and located in tandem so that each engages a part of pipe lengthwise thereof, each saddle having a pipe receiving receptacle extending lengthwise thereof, located between the ends thereof and opening at the top thereof, said pipe receiving receptacle having downwardly sloping sides extending from the top of said saddle and having first and second notches, each adapted for engaging and supporting a part of a length of pipe, said first notch being located at the lowest part of said receptacle where the downwardly sloping sides thereof meet, said second notch being on one of said downwardly sloping sides below said top and spaced apart from said first notch by a land which is a part of said one downwardly sloping side, each notch being of such size that it accommodates a single length of pipe, an adapter for each test head suitable for mounting upon each head opposite the ends of the pipe, each adapter extending outwardly from its head towards the ends of the pipe and having two spaced apart longitudinal passageways extending substantially therethrough, a piston disposed in each of said passageways for travel in slidable engagement therewith, that end of each of said pistons opposite an end of a pipe to be tested having a recess for receiving the end of the pipe and having sealing means for effecting a seal with the pipe, means disposed in each of said passageways and in engagement with said piston therein for urging said piston toward the end of the pipe, said adapter having stop means for limiting travel of said pistons in their respective passageways, each of said passageways opening into a chamber of said adapter, each of said pistons having a longitudinal hole extending therethrough and opening to the end of the pipe to be tested and connecting into said chamber so that hydraulic fluid may flow through said chamber and each of said holes to and from said pipe, one of said passageways being so located on its adapter that it is in alignment with said first notch of each of said saddles and said other passageway being so located on said adapter that it is in alignment with said second notch of each of said saddles.

12. The apparatus of claim 11 characterized by each of said passageways of said adapter being slightly greater in diameter than the outside diameter of each pipe to be tested and each of said pistons having an outside diameter slightly greater than the outside diameter of each pipe to be tested to insure maintenance of said seal with the ends of the pipe during testing.

13. The apparatus of claim 11 characterized by each of said pistons of said adapter having a first part disposed in each of said passageways and being in slidable engagement therewith, having a second part which extends outwardly from the end of said passageway towards said end of the pipe and which is outside said passageway, said second part having a recess for receiving the end of the pipe, said recess having sealing means for effecting a seal with the end of the pipe, said adapter and each of said pistons having cooperating means for limiting travel of each of said pistons in their respective passageways.

14. The apparatus of claim 11 characterized by movable means disposed transverse of said lengths of pipe, disposed adjacent each of said saddles and opposite said one side with the second notch, said movable means having a pipe engaging part, cooperating means for moving said movable means toward said one side so that said pipe engaging part contacts a second length of pipe in said receptacle and in its delivered position from a source of pipe whereat it lies at least partially on a first length of pipe located in said first notch, movement of said movable means toward said one side conveying said second length of pipe from its delivered position into said second notch, during conveying of said second length of pipe, said land cooperating in directing the second length of pipe into said second notch.

15. The movable means of claim 14 characterized by said movable means also being a clamping means whose pipe engaging part simultaneously contacts said first and said second lengths of pipe when said two lengths are disposed in their respective notches and maintains said two lengths of pipe in their respective notches during testing said pipe.

16. The apparatus of claim 11 characterized by each of said passageways of said adapter being slightly greater in diameter than the outside diameter of each pipe to be tested and each of said pistons disposed in said passageways having an outside diameter slightly greater than the outside diameter of each pipe to be tested to insure maintenance of said seal with the ends of the pipe during testing, and movable means disposed transverse of said lengths of pipe, disposed adjacent each of said saddles and opposite said one side with the second notch, said movable means having a pipe engaging part, cooperating means for moving said movable means toward said one side so that said pipe engaging part contacts a second length of pipe in said receptacle and in its delivered position from a source of pipe whereat it lies at least partially on a first length of pipe located in said first notch, movement of said movable means toward said one side conveying said second length of pipe from its delivered position into said second notch, during conveying of said second length of pipe, said land cooperating in directing the second length of pipe into said second notch.

17. The movable means of claim 16 characterized by said movable means also being a clamping means whose pipe engaging part simultaneously contacts said first and said second lengths of pipe when said two lengths are disposed in their respective notches and maintains said two lengths of pipe in their respective notches during testing said pipe.

18. In apparatus for doubling capacity of a pipe tester to handle and test lengths of pipe, said tester having spaced apart heads for engaging and sealing the ends of pipe and for filling the pipe with hydraulic fluid under pressure, the invention comprising an adapter for one of said heads, said adapter being suitable for mounting upon said head opposite the ends of the pipe, extending outwardly from the head towards the ends of the pipe and having two spaced apart pipe end cavities extending longitudinally substantially therethrough, each pipe end cavity receiving at one end an end of the pipe and having pipe end sealing means for effecting a seal with the end of the pipe entered therein, each of said pipe end cavities opening at its other end into a chamber of said adapter so that hydraulic fluid may flow through said chamber and each of said pipe end cavities to and from pipe disposed therein.

19. In apparatus for doubling capacity of a pipe tester to handle and test lengths of pipe, said tester having spaced apart heads for engaging and sealing the ends of pipe and for filling the pipe with hydraulic fluid under pressure, the invention comprising an adapter suitable for mounting upon each test head opposite the ends of the pipe, one of said adapters extending outwardly from its head towards the ends of the pipe and having two spaced apart pipe end cavities extending longitudinally substantially therethrough, each pipe end cavity receiving at one end an end of the pipe and having pipe end sealing means for effecting a seal with the end of the pipe, each of said pipe end cavities opening at its other end into a chamber of said adapter so that hydraulic fluid may flow through said chamber and each of said cavities to and from the pipe, the other of said adapters extending outwardly towards the pipe and having two spaced apart longitudinal passageways extending substantially therethrough, a piston disposed in each of said passageways and being in slidable engagement therewith, that end of each of said pistons opposite an end of a pipe to be tested having a recess for receiving the end of the pipe and having sealing means for effecting a seal with the end of the pipe, means disposed in each of said passageways and in engagement with said piston therein for urging said piston toward the end of the pipe, said other adapter having stop means for limiting travel of said pistons in their respective passageways, each of said passageways opening into a chamber of said other adapter, each of said pistons having a longitudinal hole extending therethrough and opening into the end of a length of pipe and connecting into said chamber so that hydraulic fluid may flow through said chamber and each of said holes to and from said pipe, each of said passageways being slightly greater in diameter than the outside diameter of each pipe being tested to insure maintenance of said seal with the end of the pipe during testing.

20. The apparatus of claim 19 characterized by each of said pistons of said other adapter having a first part disposed in each of said passageways and being in slidable engagement therewith, having a second part which extends outwardly from the end of said passageway towards said end of the pipe and which is outside said passageway, said second part having a recess for receiving the end of the pipe, said recess having sealing means for effecting a seal with the end of the pipe, said other adapter and each of said pistons having cooperating means for limiting travel of each of said pistons in their respective passageways.

21. In apparatus for doubling capacity of a pipe tester to handle and test lengths of pipe, said tester having spaced apart heads for engaging and sealing the ends of pipe and for filling the pipe with hydraulic fluid under pressure, the invention comprising an adapter for one of said heads, said adapter being suitable for mounting upon said head opposite the ends of the pipe, extending outwardly towards the pipe and having two spaced apart longitudinal passageways extending substantially therethrough, a piston disposed in each of said passageways for travel in slidable engagement therewith, that end of each of said pistons opposite an end of a pipe to be tested having a recess for receiving the end of the pipe and having sealing means for effecting a seal with the pipe, means disposed in each of said passageways and in engagement with said piston therein for urging said piston toward the end of the pipe, said adapter having stop means for limiting travel of said pistons in their respective passageways, each of said passageways opening into a chamber of said adapter, each of said pistons having a longitudinal hole extending therethrough and opening to the end of the pipe to be tested and connecting into said chamber so that hydraulic fluid may flow through said chamber and each of said holes to and from said pipe.

22. The adapter of claim 21 characterized by each of said passageways being slightly greater in diameter than the outside diameter of each pipe to be tested and each of said pistons having an outside diameter slightly greater than the outside diameter of each pipe to be tested to insure maintenance of said seal with the ends of the pipe during testing.

23. In apparatus for testing and/or processing lengths of pipe, at least two saddles for receiving and supporting lengths of pipe, said saddles being disposed substantially transverse relative to said lengths of pipe, being spaced apart from each other and located in tandem so that each engages a part of pipe lengthwise thereof, each saddle having a pipe receiving receptacle extending lengthwise thereof, located between the ends thereof and opening at the top thereof, said pipe receiving receptacle having downwardly sloping sides extending from the top of said saddle and having first and second notches, each adapted for engaging and supporting a part of a length of pipe, said first notch being located at the lowest part of said receptacle where the downwardly sloping sides thereof meet, said second notch being on one of said downwardly sloping sides below said top surface and spaced apart from said first notch by a land which is a part of said one downwardly sloping side, each notch being of such size that it accommodates a single length of pipe.

24. The saddle of claim 23 characterized by said one downwardly sloping side with said second notch having a more gentle slope than said other side, by said land extending from its most outwardly projecting point downwardly into said first notch and upwardly into said second notch.

25. In apparatus for testing and/or processing lengths of pipe, at least two saddles for receiving and supporting lengths of pipe, said saddles being disposed substantially transverse relative to said lengths of pipe, being spaced apart from each other and located in tandem so that each engages a part of pipe lengthwise thereof, each saddle having a pipe receiving receptacle extending lengthwise thereof, located between the ends thereof and opening at the top thereof, said pipe receiving receptacle having downwardly sloping sides extending from the top of said saddle and having first and second notches, each adapted for engaging and supporting a part of a length of pipe, said first notch being located at the lowest part of said receptacle where the downwardly sloping sides thereof meet, said second notch being on one of said downwardly sloping sides below said top surface and spaced apart from said first notch by a land which is a part of said one downwardly sloping side, each notch being of such size that it accommodates a single length of pipe, and movable means disposed transverse of said lengths of pipe, disposed adjacent each of said saddles and opposite said one side with the second notch, said movable means having a pipe engaging part, cooperating means for moving said movable means toward said one side so that said pipe engaging part contacts a second length of pipe in said receptacle and in its delivered position from a source of pipe whereat it lies at least partially on a first length of pipe located in said first notch, movement of said movable means toward said one side conveying said second length of pipe from its delivered position into said second notch, during conveying of said second length of pipe, said land cooperating in directing the second length of pipe into said second notch.

26. The movable means of claim 25 characterized by said movable means also being a clamping means whose pipe engaging part simultaneously contacts said first and said second lengths of pipe when said two lengths are disposed in their respective notches and maintains said two lengths of pipe in their respective notches during testing and/or processing said pipe.

No references cited.